J. V. M. RISBERG.
SELF ADJUSTING BEARING.
APPLICATION FILED FEB. 16, 1906.
902,912.
Patented Nov. 3, 1908.
2 SHEETS—SHEET 1.
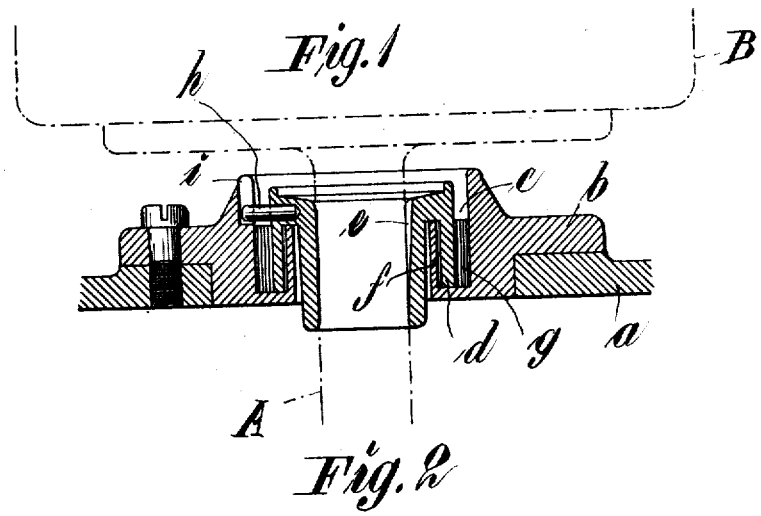
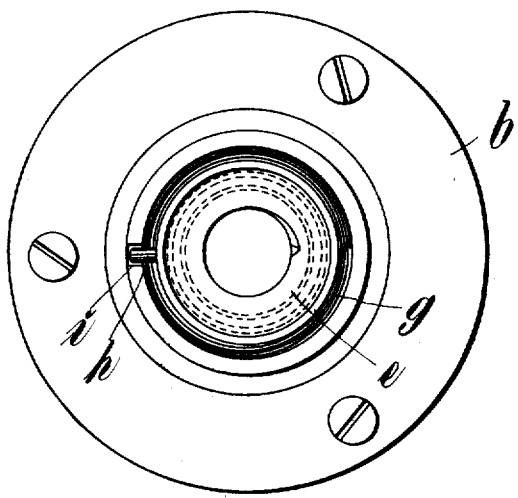
Inventor:
Johannes Valdemar Mårten Risberg

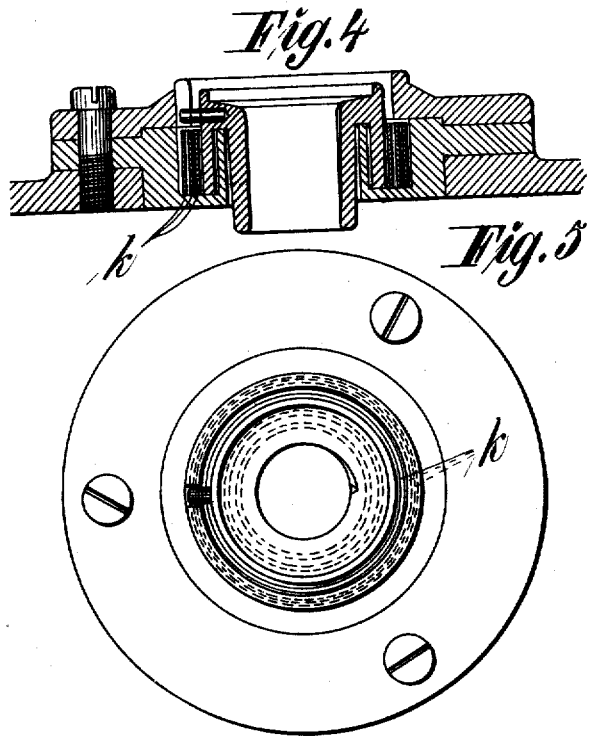

UNITED STATES PATENT OFFICE.

JOHANNES VALDEMAR MÅRTEN RISBERG, OF SÖDERTELJE, SWEDEN, ASSIGNOR TO AKTIEBOLAGET BALTIC-SEPARATOR, OF STOCKHOLM, SWEDEN.

SELF-ADJUSTING BEARING.

No. 902,912.    Specification of Letters Patent.    Patented Nov. 3, 1908.

Application filed February 16, 1906. Serial No. 301,489.

*To all whom it may concern:*

Be it known that I, JOHANNES VALDEMAR MÅRTEN RISBERG, a subject of the King of Sweden, residing at Södertelje, in the Kingdom of Sweden, have invented new and useful Improvements in Self-Adjusting Bearings, of which the following is a specification.

This invention relates to improvements in such self-adjusting bearings for vertical shafts rotating at high speed in which a projection or flange on the bush enters a chamber arranged around the said bush and containing suitable liquid, which, together with the said flange has retarding action on the lateral movement of the shaft in every horizontal direction but permits centering.

The object of the invention is to considerably increase the self-adjusting capacity of the said bearings.

In bearings of the construction stated the width of the space between the flange of the bush and the wall of the chamber containing the liquid must be adapted to the viscosity of the said liquid, the said space being made greater, when a liquid of great viscosity is used, and narrower on the other hand. For that reason, if the liquid consists of oil used for the lubrication of the bearing, the width of the said space will be too narrow and the bearing will not be able to serve its purpose. If, on the other hand, the width of the said space is increased, so that the shaft can oscillate sufficiently, the viscosity of the oil is not great enough to exert necessary resistance against the pressure of the shaft laterally. If, again, the space is made so great, as according to my invention, that the chamber can contain a band of metal or any other suitable material wound spirally around the flange of the bush in such a manner that between the layers of the spiral band spaces are provided, corresponding to the viscosity of the oil, the number of layers of the spiral band may be so adapted, that the bush can move laterally for the necessary distance. Consequently, the principle, upon which my invention is based, consists in increasing the capacity of the bush to move laterally by providing a plurality of thin liquid layers around the same.

Figure 1 in the accompanying drawings is a vertical section and Fig. 2 is a plan view of a bearing arranged in accordance with this invention. Fig. 3 is a plan view of the said spiral band. Figs. 4 and 5 are a vertical section and a plan view respectively of another form of the invention.

In these views I have shown my improved shaft bearing adapted for application to the shaft of a centrifugal cream separator, but since the particular character of the machine or apparatus to which the improved bearing is applied for use forms no part of the present invention I have only shown said shaft in dotted lines at A and a portion of the centrifugal drum also in dotted lines at B in Fig. 1 of the drawings.

*a* represents a fragment of the frame and *b* is a ring or annular part mounted on the frame and surrounding said shaft A and provided with an annular chamber *c* open at the top of said ring or annular part *b*, and extended concentrically around the said shaft in position to receive a supply of oil or other suitable liquid. Said annular chamber is also adapted to receive the lower edge portion of an annular flange *d* pendent from the upper part of a bush *e* wherein the shaft is adapted to turn freely. The inner wall of the annular chamber *c* is formed by an annular upturned flange *f* integrally produced around the top surface of the ring or part *b* at the inner portion thereof, said flange *f* being of such diameter as to receive the bush *e* within it and permit a certain extent of lateral movement thereof in horizontal directions.

According to my invention, as shown in Figs. 1 to 3, a band *g* of metal or other suitable material is wound in volute form around the flange *d*. The said volute band is shown in detail in Fig. 3. *h* is a pin fixed in the bush *e* and laterally directed across one side of the annular chamber *c* above the volute band *g* in such a manner as to be adapted to prevent said band from being accidentally dislodged from position within said chamber, while offering no obstruction to the removal of the band therefrom when the bush *e* is raised to elevate its pendent annular flange from the chamber. The outer extremity of the said pin *h* is engaged in a recess *i* in the disk *b*, outside of the annular chamber *c* in such a manner as to operate to prevent the bush *e* from participating in the rotatory movement of the shaft A whereon the centrifugal drum B is carried. The said shaft A and drum B are represented in broken lines in Fig. 1.

The space between the bush and the outer wall of the chamber c is so adapted, that spaces of about 0.1 mm. are formed between the different layers of the band g and it will be evident that the inherent resilience of the metal or other suitable material from which the said band is produced will operate to maintain these narrow spaces open and to prevent the several plies or layers of the volute band from contacting with each other and thereby closing such spaces. When the chamber c is filled with oil, the oil fills up the said narrow spaces and, owing to its viscosity, it has a retarding effect upon the lateral movement of the bush, as in bearings of this class hitherto used, but the bush can be moved a considerably greater distance laterally than in bearings hitherto used owing to the great number of narrow spaces; and, conversely, if a certain total play in the bearing is wanted, the said play may be divided into a plurality of narrower spaces by means of the band in such a manner, that to each of the said spaces a width is imparted, which corresponds to the viscosity of the oil. Instead of one band two or more bands may, evidently, be used and instead of the band being mounted outside the flange d it may be mounted inside the same and bear against the flange f, as is readily understood by those skilled in the art.

In the modified form of the invention shown in Figs. 4 and 5 tube like rings k, slid into each other and mounted at a distance of about 0.1 mm. from each other, are substituted for the band g, shown in Figs. 1 to 3, or for one or more bands in the construction stated above. By this arrangement the same effect is gained as by means of the spiral band.

Having now described my invention, what I claim as new and desire to secure by Letters Patent is:

1. A shaft bearing comprising a horizontally extended part having an annular chamber produced in its upper surface and adapted to contain a supply of liquid, a bush adapted to support a vertically extended shaft and provided with an annular flange pendent from it within said annular chamber and out of contact with the walls thereof, and a packing formed from laminated material arranged in the annular chamber between said flange of the bush and one of the walls of the chamber and adapted to be immersed in the liquid contained in the chamber to retard oscillatory movement of the said bush.

2. A shaft bearing comprising a horizontally extended part having an annular chamber produced in its upper surface and adapted to contain a supply of liquid, a bush adapted to support a vertically extended shaft and provided with an annular flange pendent from it within said annular chamber and out of contact with the walls thereof, a packing formed from laminated material arranged in the annular chamber between said flange of the bush and one of the walls of the chamber and adapted to be immersed in the liquid contained in the chamber to retard oscillatory movement of the said bush, and a part laterally extended from the bush across the annular chamber of the horizontally extended part above said laminated packing, and adapted to retain the same within said annular chamber when the annular flange of the bush is within said chamber.

3. A shaft bearing comprising a horizontally extended part having an annular chamber produced in its upper surface and adapted to contain a supply of liquid, a bush adapted to support a vertically extended shaft and provided with a projection pendent from it within said annular chamber and out of contact with the walls thereof, and a spiral band of suitable material extended within said chamber and interposed between one wall thereof and the said projection of the bush to retard oscillatory movement of the bush.

In testimony whereof I have signed my name to this specification in the presence of two subscribing witnesses.

JOHANNES VALDEMAR MÅRTEN RISBERG.

Witnesses:
CARL FRIBERG,
ROBERT APELGREN.